United States Patent Office 3,677,739
Patented July 18, 1972

3,677,739
HERBICIDAL 3,4,5-TRISUBSTITUTED BENZAMIDES
Bruce W. Horrom, Waukegan, and Aldo J. Crovetti, Lake Forest, Ill., and Kenneth L. Viste, Warminster, Pa., assignors to Rohm and Haas Company, Philadelphia, Pa.
No Drawing. Continuation-in-part of application Ser. No. 671,946, Oct. 2, 1967, which is a continuation-in-part of application Ser. No. 608,271, Jan. 10, 1967. This application Mar. 5, 1969, Ser. No. 804,678
Int. Cl. A01n 9/20
The portion of the term of the patent subsequent to Oct. 13, 1987, has been disclaimed
U.S. Cl. 71—118                3 Claims

ABSTRACT OF THE DISCLOSURE

Herbicidal compositions containing as the active ingredient a novel compound belonging to the class of N-(1,1-dimethylpropynyl)-3,4,5-trisubstituted benzamides.

CROSS-REFERENCE TO RELATED APPLICATIONS

This application is a continuation-in-part of U.S. applications Ser. Nos. 608,271, filed Jan. 10, 1967, now abandoned and Ser. No. 671,946, filed Oct. 2, 1967, now U.S. Pat. 3,534,098, which latter application in turn is a continuation-in-part of U.S. Ser. No. 608,271.

This invention is directed to various herbicidal compositions and the employment of these herbicidal compositions in the control of undesirable plant growth.

The compounds useful as the active ingredients of this invention are N-(1,1-dimethylpropynyl)-3,5-dichloro-4-substituted benzamides and may be represented structurally by the following formula:

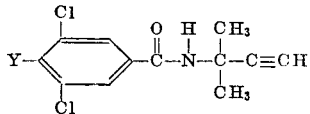

wherein Y is selected from $NH_2$, Cl, F and $CH_3$. These compounds have been found to exhibit outstanding herbicidal activity and are particularly effective as selective preemergence herbicides. The benzamides may be applied to the environment in which control of plant growth is desired by utilizing them in a solution, dispersion or as mixtures with a solid carrier. For preemergence weed control, the herbicidal formulation may be applied to the surface of the soil or incorporated into the soil.

It has long been desired to discover chemical compounds that will prevent, control or destroy undesirable plant growth such as weeds in areas in which desirable vegetation such as food crops are to be grown or are growing. Use of chemical means for regulating undesired growth is usually preferable to the time consuming and less permanent mechanical means such as tilling and mowing. Chemical agents for destroying undesired vegetation are called herbicides. These may be selective or non-selective. A selective herbicide destroys or stunts particular plants with little or no injury to others whereas a nonselective herbicide is toxic to a broad spectrum of plant life. Herbicides may be further classified, based on the time of application, as preemergence and postemergence. A preemergence herbicide is one applied prior to the appearance of a crop or weed, whereas a postemergence herbicide is applied subsequent to the appearance of a crop or weed. Of course a selective herbicide that will destroy the undesirable plant growth associated with the crop, but will not injure the crop itself, is preferred.

Aromatic benzamides of the following formula are known and described in U.S. Pat. 3,133,963, issued May 19, 1964:

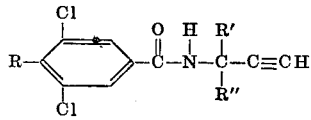

wherein R is methoxy or amino, and R' and R" are lower alkyls.

The novel compounds of this invention are prepared by the amidation of the acid or acid derivative and the appropriate amine. More specifically a 3,5-dichloro-4-substituted benzoyl chloride is reacted with 3-amino-3-methylbutyne. The 3,5-dichloro-4-substituted benzoic acids used as starting materials in the preparation of compounds of this invention are all known in the literature, except 3,5-dichloro-4-fluorobenzoic acid. The acetylenic amine may be prepared by the method of G. F. Hennion and Eugene G. Teach, described in the Journal of the American Chemical Society, 75, 1653–4 (1953). (See Compound I of Table I in this reference.)

In general the benzamides of this invention are effective in the control of various grassy and broadleaf weeds and are particularly effective in controlling wild oats (*Avena fatua*), Johnsongrass (*Sorghum halepense*), ryegrass (*Lolium* spp.), crabgrass (*Digitaria* spp.), barnyardgrass (*Echinochloa crusgalli*), lambsquarter (*Chenopodium* spp.), dock (*Rumex* spp.), wild carrot (*Daucus carota*), and velvetleaf (*Abutilon theophrasti*). Crops which have been demonstrated to have tolerance to the herbicidal benzamides of this invention include alfalfa (*Medicago sativa*), corn (*Zea maize*), cotton (*Gossypium hirsutum*), cowpeas (*Vigna sinensis*), peanuts (*Arachis hypogaea*), peas (*Pisum arvense*), rice (*Oryza sativa*), safflower (*Carthamus tinctorius*) and soybeans (*Glycine max*).

The compositions of the invention comprise an N-(1,1-dimethylpropynyl) - 3,5-dichloro-4-substituted benzamide together with an agronomically acceptable carrier. By an agronomically acceptable carrier is meant any substance which can be used to dissolve, disperse, or diffuse the chemical within it, without impairing the effectiveness of the toxic agent, which is not permanently deleterious to the soil in any chemical or physical manner and which is usually nonphytocidal to the agricultural crops to be protected. The compositions may be in the form of solutions, emulsifiable concentrates, wettable powders, granules, or dusts. One or more liquid or solid carriers may be used for a particular herbicidal composition.

An emulsifiable concentrate is made by dissolving an N-(1,1-dimethylpropynyl) - 3,5 - dichloro - 4 - substituted benzamide in a solvent to which one or more surfactants are added. Suitable solvents or liquid carriers for use in preparing these emulsifiable concentrates may, for example, be found in the hydrocarbon and ketone classes of organic solvents such as xylene, acetone, isophorone, mesityl oxide, cyclohexanone and mixtures of these. Preferred solvents are ketone-hydrocarbon mixtures such as isophorone-xylene. The emulsifying agents used are surfactants of the anionic, cationic, or non-ionic types and mixtures thereof. Representative of the anionic surfactants are fatty alcohol sodium sulfates, calcium alkylbenzenesulfonates and sodium dialkyl sulfosuccinates. Representative of the cationics are (higher alkyl) dimethylbenzylammonium chlorides. Representative of the nonionics are condensation products of alkylene oxides with fatty alcohols alkyl phenols, mercaptans, amines or fatty acids, such as dinonylphenoxypolyethoxyethanol in which there are 8 to 100 ether groupings and similar polyethoxy compounds prepared with other hydrophilic groupings, including esters of long chain fatty acids and mannitan or sorbitan, which are reacted with ethylene oxide.

The following compositions are typical of emulsifiable concentrate formulations when solvents are used.

|  | Parts/100 parts total |
|---|---|
| N - (1,1-dimethylpropynyl)-3,5-dichloro - 4 - substituted benzamide | 10–35 |
| Solvent | 55–88 |
| Emulsifying agent | 2–10 |

Wettable powder formulations comprise an N-(1,1-dimethyl propynyl)-3,5-dichloro - 4 - substituted benzamide admixed in a solid carrier along with a surface active agent(s) which gives this type of formulation its wettability, dispersibility and spreading characteristics. Solid carriers which are suitable for preparing these wettable powder formulations are those which have been rendered agronomically suitable by pulverizing devices and may be organic or inorganic in nature. Suitable organic carriers are soybean, walnut or wood flour or tobacco dust, and suitable inorganic ones are clays of the montmorillonite (bentonite), kaolinite or fuller's earth types; silicas such as diatomaceous earth and hydrated silica; silicates such as talc, pyrophyllite, or alkaline earth silicates; and calcium and magnesium carbonates. A surfactant or mixture of surfactants is added to the wettable powder formulation. Suitable dispersing agents are sodium lignin sulfonate, sodium formaldehyde - naphthalene sulfonate, or sodium N-methyl-N-higher alkyl taurates. Wetting agents useful for this purpose include higher alkylaryl sulfonates such as calcium dodecylbenzenesulfonate, long-chained alcohol sulfates, sodium alkylphenoxypolyethoxyethyl sulfonates, sodium dioctyl sulfosuccinate, and ethylene oxide adducts with fatty alcohols or with higher alkylphenols, such as octylphenoxypolyethoxyethanol in which there are 8 to 80 ether groupings and similar polyethoxy compounds made from stearyl alcohol. Operative spreading or adhesive agents include glycerol mannitan laurate or a condensate of polyglycerol and oleic acid modified with phthalic anhydride. Additionally many of the surfactants discussed above function as spreading and adhesive agents. The active ingredient content of the wettable powders may be in the range of about 20 to 80%; however, the preferred range of concentration is 50 to 75%.

The following compositions are typical for wettable powder formulations:

|  | Parts/100 parts total |
|---|---|
| N - (1,1-dimethylpropynyl)-3,5-dichloro - 4 - substituted benzamide | 20–80 |
| Carrier | 10–79 |
| Surfactant(s) | 1–10 |

Dust concentrates are made by incorporating a N-(1,1-dimethylpropynyl)-3,5-dichloro-4-substituted benzamide of this invention into a solid carrier such as finely powdered clays, talc, silica and synthetic silicates, alkaline earth carbonates and diluents of natural origin, such as tobacco dust or walnut shell flour. Granular formulations are made from similar type solid carriers except that the particle size is larger, in the range of 15 to 60 mesh. A small amount of dispersing agent may be incorporated into these solid formulations. The concentration of active ingredients in these dust or granular formulations may be in the range of 2 to 15%.

It will be seen from the above that the compositions of this invention may contain 20% to 98% of carrier based on the total weight of the composition depending on whether it is in the form of a solution, an emulsifiable concentrate, a wettable powder, a dust or a granular formulation.

A particularly convenient method for making solid formulations is to dissolve the active ingredient in a volatile solvent, such as acetone, apply this solution to the solid carrier with thorough mixing, and then remove the solvent by allowing it to evaporate at either normal or reduced pressure.

In preparing the N-(1,1-dimethylpropynyl)-3,5-dichloro-4-substituted benzamides of this invention, equal molar ratios of the acid or acid derivative and amine reactants are preferred although a molar excess of amine up to 1:2.5 may be employed. When the acyl halide is used, an acid acceptor such as tertiary amine, an alkali metal hydroxide and an alkaline earth oxide, hydroxide or carbonate is preferred. Representative acid acceptors are sodium hydroxide, calcium carbonate, pyridine, triethylamine, benzyldimethylamine and magnesium oxide. Although not required, an inert organic solvent of the hydrocarbon, halogenated hydrocarbon, ketone or ether classes of solvents is desirable. Suitable solvents are toluene, ethylene dichloride, octane, methyl isobutyl ketone and commercial hydrocarbon mixtures boiling in the range of 90° to 125° C. The amidation reaction may be accomplished in the range of 0 to 50° C. with 10 to 20° C. being preferred. The time of reaction is not critical, but it is usually completed within one to three hours. While the preferred method of amidation is to employ the acyl halide, the acid and acid derivatives such as the alkyl ester gave suitable results. If the acid is used, an acid catalyst, such as hydrochloric or sulfuric acid, is employed to facilitate dehydration of the amine salt to the amide. Use of the alkyl ester, such as the ethyl ester, results in an interchange reaction to produce the amide.

Details of preparing the active ingredient and typical formulations are given in the following examples which are presented for purposes of illustration and are not intended to limit the scope of the invention.

PREPARATION OF THE ACTIVE INGREDIENT

PREPARATION I

N-(1,1-dimethylpropynyl)-3,5-dichloro-4-fluorobenzamide (a) 3,5-dichloro-4-fluoroisopropylbenzene: To a solution of 2,6-dichlorofluorobenzene (33 g., 0.2 mole) made by the method of A. Pavlath et al. (see Chem. Abstracts 51, 8666h (1957)) in 12 ml. of carbon disulfide cooled to 0° C. was added portionwise anhydrous aluminum chloride (5.4 g., 0.04 mole). To the mixture with cooling was added isopropyl bromide (24.6 g., 0.2 mole) dropwise in 1 hour. The mixture was stirred 4 hrs. and was then allowed to warm to room temperature overnight. The reaction mixture was poured onto ice, extracted with ether and the ether extract was washed with water, dilute hydrochloric acid, water, dilute potassium carbonate solution and water then was stripped of the ether. Residual water was removed by azeotroping with benzene and the benzene removed to give 38 g. of dark green liquid. This was distilled to give as the main fraction 20 g. of 3,5-dichloro - 4 - fluoroisopropylbenzene distilling at 119–122° C./22 mm.

(b) 3,5-dichloro-4-fluorobenzoic acid: To a solution of 0.2 g. of ammonium vanadate in 85 ml. of 71% nitric acid and 85 ml. of water in a 500 ml. round-bottom flask was added 3,5-dichloro-4-fluoroisopropylbenzene (20 g., 0.097 mole). The mixture was stirred overnight magnetically at reflux temperature. Cooling to room temperature gave white needles which were filtered off, washed with pentane and dried in a vacuum oven at 42° C. for 2 hrs. to give 8 g. of solid which was recrystallized from ethyl acetate to give 4.5 g. of white solid melting at 191.5–193° C. This was found by analysis to contain 40.1% C, 1.5% H, 33.5% Cl and 9.5% F; calculated for $C_7H_3Cl_2FO_2$ is 40.2% C, 1.45% H, 33.9% Cl and 9.1% F. The product is 3,5-dichloro-4-fluorobenzoic acid and this is supported by infrared and nuclear magnetic resonance spectra.

(c) N-(1,1-dimethylpropynyl) - 3,5 - dichloro-4-fluorobenzamide: A reaction mixture of 3,5-dichloro-4-fluorobenzoic acid (4.5 g., 0.0215 mole) and 50 ml. of thionyl chloride was heated at reflux temperature for 3 hrs. and the excess thionyl chloride was distilled off. The residue of 3,5-dichloro-4-fluorobenzoyl chloride was dissolved in 15 ml. of benzene and this solution was added dropwise with cooling to a benzene solution of 3-amino-3-methylbutyne (5 g., 0.06 mole). The resulting suspension was stirred at room temperature for 3 hrs. and was then diluted with ether and water. The organic layer was washed with water and concentrated to give 5.7 g. of oil which solidified. The solid was recrystallized from aqueous methanol and dried to give 3.8 g. of solid melting at 133.5–135° C. This was found to contain by analysis 52.0% C, 3.7% H, 25.55% Cl, 6.7% F and 5.0% N; calculated for $C_{12}H_{10}Cl_2FNO$ is 52.5% C, 3.7% H, 25.9% Cl, 6.9% F and 5.1% N. The product is N-(1,1-dimethylpropynyl)-3,5-dichloro-4-fluorobenzamide.

PREPARATION II

N-(1,1-dimethylpropynyl)-3,5-dichloro-4-methylbenzamide

The known 3,5-dichloro-4-methylbenzoic acid (see Beilsteins Handbuch IX, page 498) was prepared by a method similar to that of Preparation I (b) and was found to melt at 188–190° C. This acid was converted to the acid chloride which was then reacted with 3-amino-3-methylbutyne by the method of Preparation I (c). The resulting solid was recrystallized from aqueous methanol and from octane and was found to melt at 133–135° C. It was found to contain by analysis 57.75% C, 5.0% H, 26.4% Cl and 5.2% N; calculated for $C_{13}H_{13}Cl_2NO$ is 57.8% C, 4.85% H, 26.45% Cl and 5.2% N. The product is N-(1,1-dimethylpropynyl)-3,5-dichloro-4-methylbenzamide.

PREPARATION III

N-(1,1-dimethylpropynyl)-3,4,5-trichlorobenzamide

A preparation of the known 3,4,5-trichlorobenzoic acid (see Beilsteins Handbuch IX, page 346) was converted to the acid chloride which was then reacted with 3-amino-3-methylbutyne by the method of Preparation I (c). The resulting solid melted at 151–154° C. It was found to contain by analysis 49.8% C, 3.5% H, 36.7% Cl, 4.8% N and 5.5% O; calculated for $C_{12}H_{10}Cl_2NO$ is 49.6% C, 3.5% H, 36.6% Cl, 4.8% N and 5.5% O. The product is N-(1,1-dimethylpropynyl)-3,4,5-trichlorobenzamide.

EXAMPLE 1

An emulsifiable concentrate of N-(1,1-dimethylpropynyl)-3,4,5-trichlorobenzamide was made by dissolving 13.5 parts of the aforementioned benzamide in a solution of 3 parts of an emulsifier and the balance to make 100 parts of isophorone-xylene (2:1) solvent. The emulsifier contained dinonylphenoxypolyethoxyethanol containing 20 ethoxy groups, the reaction product of tert-tridecylamine with 35 units of ethylene oxide and 45 units of propylene oxide, and calcium dodecylbenzenesulfonate. This gave an emulsifiable concentrate which contained about one pound of active ingredient per gallon.

EXAMPLE 2

An emulsifiable concentrate was prepared by the method of Example 1 by employing 13% N-(1,1-dimethylpropynyl)-3,4,5-trichlorobenzamide, 10% emulsifier and 77% cyclohexanone.

EXAMPLE 3

In a blender a wettable powder was prepared by adsorbing onto a hydrated silica having an average particle size of 0.02–0.03 micron a mixture of 50 parts of N-(1,1-dimethyl-propynyl)-3,4,5-trichlorobenzamide, 5 parts sodium lignin sulfonate, and 1 part dioctyl sodium sulfosuccinate. The hydrated silica carrier comprised the balance to make 100 parts. The resultant product was micropulverized.

EXAMPLE 4

A wettable powder was prepared by mixing together 75 parts of N-(1,1-dimethylpropynyl)-3,4,5-trichlorobenzamide, 5 parts sodium lignin sulfonate, 1 part isooctylphenoxypolyethoxyethanol having an average of 9 to 10 ethoxy units per molecule and 44 parts of a 1 to 1 mixture of finely divided attapulgite and kaolinite clays.

EXAMPLE 5

When in Examples 1–4 N-(1,1-dimethylpropynyl)-3,5-dichloro-4-fluorobenzamide was substituted as the active ingredient, corresponding formulations were obtained.

EXAMPLE 6

The procedures of Examples 1–4 were repeated but using N-(1,1-dimethylpropynyl)-3,5-dichloro-4-methylbenzamide as the active ingredient.

These herbicidal compositions may be applied broadcast to areas to be protected or applied to the environment of a growing crop or crops to be grown, as in a narrow band. Preferably, the compositions are applied prior to the appearance of weeds by incorporation into the soil but desirable results are achieved with surface treatment of the soil prior to emergence of weeds or by treatment after appearance of weeds. If the herbicidal composition is applied by soil incorporation, the composition may be mixed into the ground at a depth of four inches or less.

Greenhouse tests on a variety of monocots and dicots have shown superior control of numerous varieties of undesired vegetation and tolerance to certain desirable crops. Table I gives typical herbicidal activity of the following benzamides.

Composition:
    A—N-(1,1-dimethylpropynyl)-3,5-dichloro-4-methoxybenzamide
    B—N-(1,1-dimethylpropynyl)-3,5-dichloro-4-aminobenzamide
    C—N-(1,1-dimethylpropynyl)-3,4,5-trichlorobenzamide
    D—N-(1,1-dimethylpropynyl)-3,5-dichloro-4-fluorobenzamide
    E—N-(1,1-dimethylpropynyl)-3,5-dichloro-4-methylbenzamide The preemergence herbicidal data were obtained by spraying acetone solutions without dilution by water at the rate of 4 lbs. per acre of active ingredient. The weeds and crops were observed for injury 14 days after application of the herbicidal composition.

TABLE I

| Composition crop or weed | Percent control | | | | |
|---|---|---|---|---|---|
| | A | B | C | D | E |
| Wildoats | 0 | 90 | 100 | 100 | 95 |
| Johnsongrass | 0 | 100 | 40 | 100 | 90 |
| Crabgrass | 0 | 0 | 100 | | 100 |
| Barnyardgrass | 0 | 0 | 100 | 100 | 40 |
| Wheat | 70 | 20 | 70 | 80 | 0 |
| Pigweed | 0 | 0 | 30 | 80 | 0 |
| Cotton | 0 | 0 | 40 | 0 | 0 |
| Peas | 40 | 0 | 0 | 0 | 0 |
| Dock | 0 | 90 | 90 | 100 | 90 |

The selectivity of herbicides embraced by this invention is clearly evident by a perusal of Table I.

Promising herbicidal results have also been obtained with postemergence applications of the compounds of this invention.

Generally the active ingredient is applied at the rate of about 0.5 to 10 or more pounds per acre, with 1 to 4 pounds per acre being preferred.

In some instances it may be desirable to add one or more other pesticides. Other herbicides which can be incorporated to provide additional advantages and effectiveness include:

Carboxylic acids and derivatives 2,3,6-trichlorobenzoic acid and its salts
2,3,5,6-tetrachlorobenzoic acid and its salts
2-methoxy-3,5,6-trichlorobenzoic acid and its salts
2-methoxy-3,6-dichlorobenzoic acid and its salts 2-methyl-3,6-dichlorobenzoic acid and its salts
2,3-dichloro-6-methylbenzoic acid and its salts
2,4-dichlorophenoxyacetic acid and its salts and esters
2,4,5-trichlorophenoxyacetic acid and its salts and esters
(2-methyl-4-chlorophenoxy)acetic acid and its salts and esters
2-(2,4,5-trichlorophenoxy)propionic acid and its salts and esters
4-(2,4-dichlorophenoxy)butyric acid and its salts and esters
4-(2-methyl-4-chlorophenoxy)butyric acid and its salts and esters
2,3,6-trichlorophenylacetic acid and its salts
3,6-endoxohexahydrophthalic acid
dimethyl 2,3,5,6-tetrachloroterephthalate
trichloroacetic acid and its salts
2,2-dichloropropionic acid and its salts
2,3-dichloroisobutyric acid and its salts Carbamic acid derivatives ethyl N,N-di(n-propyl)thiolcarbamate
propyl N,N-di(n-propyl)thiolcarbamate
ethyl N-ethyl-N-(n-butyl)thiolcarbamate
propyl N-ethyl-N-(n-butyl)thiolcarbamate
2-chloroallyl N,N-diethyldithiocarbamate
N-methyldithio-carbamic acid salts
ethyl 1-hexamethyleneiminecarbothiolate
isopropyl N-phenylcarbamate
isopropyl N-(m-chlorophenyl)carbamate
4-chloro-2-butynyl N-(m-chlorophenyl)carbamate
methyl N-(3,4-dichlorophenyl)carbamate Phenols dinitro-o-(sec.-butyl)phenol and its salts
pentachlorophenol and its salts Substituted ureas 3-(3,4-dichlorophenyl)-1,1-dimethylurea
3-(4-chlorophenyl)-1,1-dimethylurea
3-phenyl-1,1-dimethylurea
3-(3,4-dichlorophenyl)-3-methoxy-1,1-dimethylurea
3-(4-chlorophenyl)-3-methoxy-1,1-dimethylurea
3-(3,4-dichlorophenyl)-1-n-butyl-1-methylurea
3-(3,4-dichlorophenyl)-1-methoxy-1-methylurea
3-(4-chlorophenyl)-1-methoxy-1-methylurea
3-(3,4-dichlorophenyl)-1,1,3-trimethylurea
3-(3,4-dichlorophenyl)-1,1-diethylurea
dichloral urea Substituted triazines 2-chloro-4,6-bis(ethylamino)-s-triazine
2-chloro-4-ethylamino-6-isopropylamino-s-triazine
2-chloro-4,6-bis(methoxypropylamino)-s-triazine
2-methoxy-4,6-bis(isopropylamino)-s-triazine
2-chloro-4-ethylamino-6-(3-methoxypropylamino)-s-triazine
2-methylmercapto-4,6-bis(isopropylamino)-s-triazine
2-methylmercapto-4,6-bis(ethylamino)-s-triazine
2-methylmercapto-4-ethylamino-6-isopropylamino-s-triazine
2-chloro-4,6-bis(isopropylamino)-s-triazine
2-methoxy-4,6-bis(ethylamino)-s-triazine
2-methoxy-4-ethylamino-6-isopropylamino-s-triazine
2-methylmercapto-4-(2-methoxyethylamino)-6-isopropylamino-s-triazine Diphenyl ether derivatives 2,4-dichloro-4'-nitrodiphenyl ether
2,4,6-trichloro-4'-nitrodiphenyl ether
2,4-dichloro-6-fluoro-4'-nitrodiphenyl ether
3-methyl-4'-nitrodiphenyl ether
3,5-dimethyl-4'-nitrodiphenyl ether
2,4'-dinitro-4-trifluoromethyldiphenyl ether Anilides N-(3,4-dichlorophenyl)propionamide N-(3,4-dichlorophenyl)methacrylamide
N-(3-chloro-4-methylphenyl)-2-methylpentanamide
N-(3,4-dichlorophenyl)trimethylacetamide
N-(3,4-dichlorophenyl)-α,α-dimethylvaleramide Uracils 5-bromo-3-s-butyl-6-methyluracil
5-bromo-3-cyclohexyl-1,6-dimethyluracil
3-chlorohexyl-5,6-trimethyleneuracil
5-bromo-3-isopropyl-6-methyluracil
3-tert-butyl-5-chloro-6-methyluracil Nitriles 2,6-dichlorobenzonitrile
diphenylacetonitrile
3,5-dibromo-4-hydroxybenzonitrile
3,5-diiodo-4-hydroxybenzonitrile Other organic herbicides 2-chloro-N,N-diallylacetamide
N-(1,1-dimethyl-2-propynyl)-3,5-dichlorobenzamide
maleic hydrazide
3-amino-1,2,4-triazole
monosodium methanearsonate
disodium methanearsonate
N,N-dimethyl-α,α-diphenylacetamide
N,N-di-(n-propyl)-2,6-dinitro-4-trifluoromethylaniline
N,N-di-(n-propyl)-2,6-dinitro-4-methylaniline
N,N-di-(n-propyl)-2,6-dinitro-4-methylsulfonylaniline
O-(2,4-dichlorophenyl)-O-methyl-isopropylphosphoramidothioate
4-amino-3,5,6-trichloropicolinic acid
2,3-dichloro-1,4-naphthaquinone
di(methoxythiocarbonyl)disulfide
6,7-dihydrodipyrido[1,2-a:2',1'-c]pyrazidinium salts
1,1'-dimethyl-4,4'-bipyridinium salts
3,4,5,6-tetrahydro-3,5-dimethyl-2-thio-2H-1,3,5-thiadiazine This invention provides compositions which are useful for inhibiting or controlling undesirable plant growth in numerous environments.

We claim:

1. A herbicidal composition consisting essentially of (1) an active ingredient having the formula:

$$Y-\underset{Cl}{\underset{|}{\overset{Cl}{\overset{|}{C_6H_3}}}}-\overset{O}{\overset{\|}{C}}-\overset{H}{\overset{|}{N}}-\overset{CH_3}{\underset{CH_3}{\overset{|}{C}}}-C\equiv CH$$

wherein Y is selected from Cl, F and CH$_3$ together with (2) an agronomically acceptable carrier.

2. A method for controlling undesirable plant growth comprising applying to the area to be controlled a herbicidally effective amount of the herbicidal composition defined in claim 1.

3. The method of claim 2 wherein the active ingredient of the herbicidal composition is applied at the rate of about 0.5 to 10 lbs. per acre.

References Cited

UNITED STATES PATENTS

| | | | |
|---|---|---|---|
| 3,436,208 | 4/1969 | Lemin | 71—118 |
| 3,357,816 | 12/1967 | Baker et al. | 71—118 |
| 3,133,963 | 5/1964 | Horrom | 260—558 |
| 2,412,510 | 12/1946 | Jones | 71—118 |
| 3,534,098 | 10/1970 | Horrom et al. | 260—558 |

LEWIS GOTTS, Primary Examiner

C. L. MILLS, Assistant Examiner

U.S. Cl. X.R.

260—558 D; 71—86, 88, 90, 92, 93, 94, 97, 100, 101, 105, 108, 109, 110, 111, 115, 116, 117